Nov. 18, 1930.  E. M. BOLTON  1,781,973
SPOON
Filed May 27, 1929   2 Sheets-Sheet 1

Inventor:
E. M. Bolton
By

Nov. 18, 1930.  E. M. BOLTON  1,781,973
SPOON
Filed May 27, 1929   2 Sheets-Sheet 2

Inventor:
E. M. Bolton
By J. H. Clarkson

Patented Nov. 18, 1930

1,781,973

UNITED STATES PATENT OFFICE

EDITH MARY BOLTON, OF GERRARD'S CROSS, ENGLAND

SPOON

Application filed May 27, 1929, Serial No. 366,369, and in Great Britain January 28, 1929.

This invention comprises a spoon, for culinary and other purposes, provided with a series of holes pierced in its bowl from the inner or concave surface thereof to displace metal to form cutting edges on its concave surface whereby the spoon may be used as a shredder or grater.

The grating surface is thus available for operating upon pieces of material of any size and form as for example forming bread crumbs from a loaf of bread, the grating surface being adapted to enter into a hollow in the loaf; and as will be readily understood the same adaptability applies to its use in the hollows formed in any other substances.

The holes in the spoon are made of any convenient shape but are preferably square or triangular and are formed in such a way that the material cut or pressed out to form a hole is left projecting outwardly from the edge of the hole in the form of sharp points upon the outer surface of the spoon.

Preferably two or more series of different sized holes are formed in any one spoon. The holes are not necessarily square or triangular, they may be elongated, and the metal displaced may project on one side only of the hole and in this case the bent out portion may be set to any desired angle, and may be bent to any desired shape to suit any specific grating or shredding purposes.

The spoon thus constructed may have hooks or prongs projecting from or formed within its bowl area and at any convenient point in the edge thereof. In the preferred form the outer edge of the hook or prong conforms to the periphery of the spoon.

The invention may be applied to any form of spoon such as in ordinary use as well as to the particular preferred form herein described.

My invention may be more fully understood by reference to the attached drawings in which:—

Figures 1, 2:
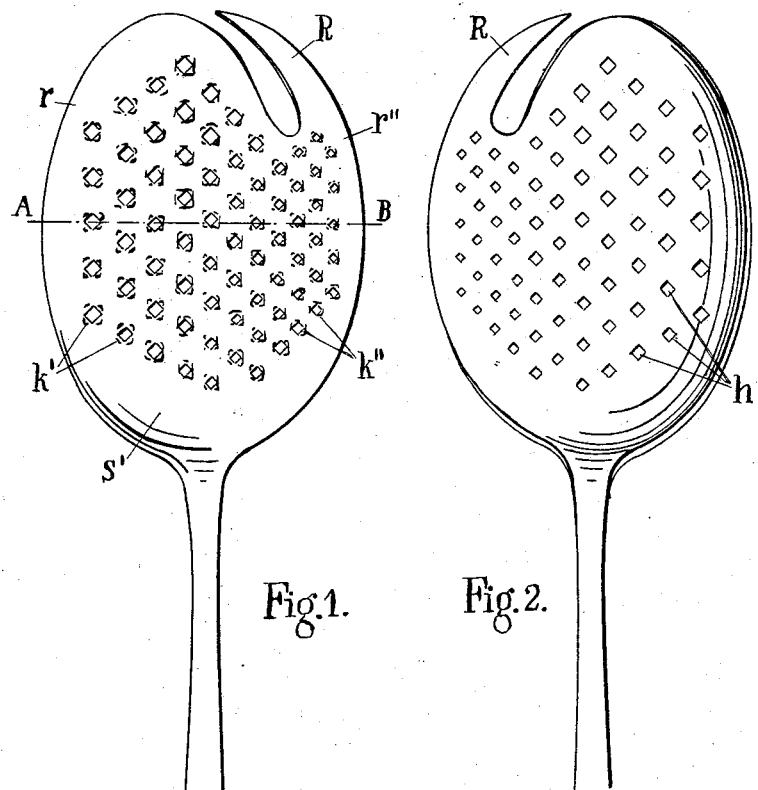
Fig. 1 is a view of the inner side of a spoon made according to this invention.
Fig. 2 is a view of the outer side.
Figure 3:
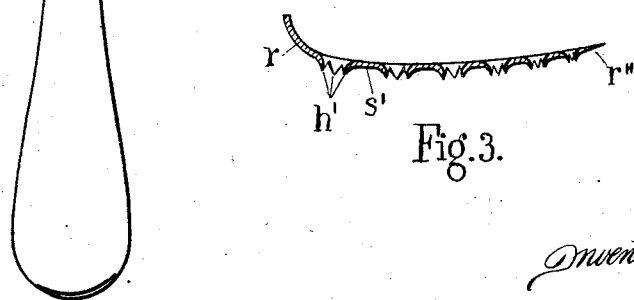
Fig. 3 is a section through the line A—B.

Referring to Figures 2 and 3, I form holes $h$ preferably square, as shown, in the bowl portion of a spoon in such a manner that pieces of the metal displaced project in triangular form with points $h'$ $h'$ on each side of the hole and on the outer side $s'$ of the spoon. The points thus formed by the series of holes constitute the spoon a grater for grating any desired material for culinary purposes.

I sometimes make the holes triangular and may make them of any convenient shape and I may vary the size of the holes so that two or more series of holes of different sizes may be formed in a spoon to constitute a coarse or fine grater as shown at $k'$ $k''$.

Figure 4:
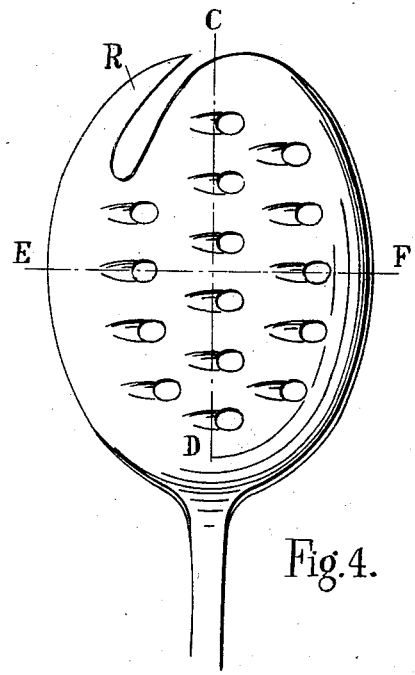
Fig. 4 shows the inner side of a modified form of spoon.
Figure 5:
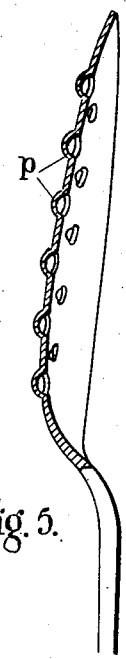
Fig. 5 is a section of same through C—D.
Figure 6:
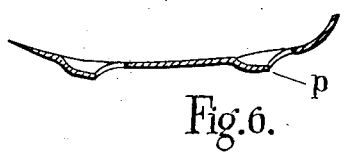
Fig. 6 is a section through E—F.

I sometimes make holes of irregular shape as may be seen for example in Figs. 4 and 5 and 6 the metal displaced being here shown as an inclined and curved or arcuate projection $p$ on the outer surface of the spoon. A spoon thus formed is of special use for cutting or shredding such articles as suet and soap and root vegetables.

Figure 7:
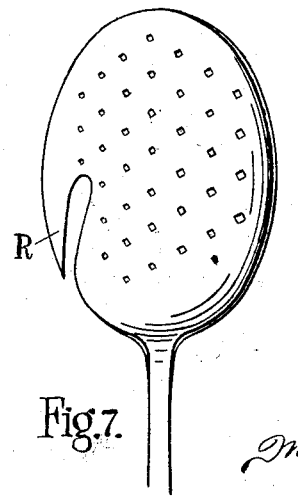

I sometimes form within the bowl area of a spoon of the type herein described a hook or prong R the outer edge of which conforms to the curvature of the edge of the bowl area, and I may make these hooks or prongs to project away from the handle or towards the handle as shown in Fig. 7, or I may make one to project towards the handle and one away from the handle. I may also make hooks or prongs projecting outwardly from the periphery of the bowl in any desired direction.

Figure 8:
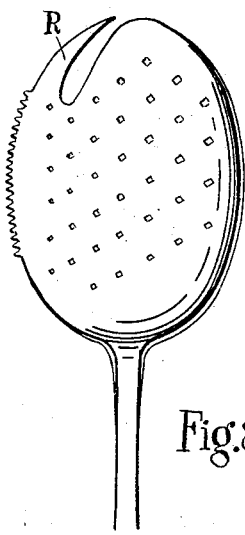
Figs. 7 and 8 show further modification.

I make one of the edges such as $r$ dished upwards as shown in section Fig. 3, while the opposite edge $r''$ is straight or is formed with a cutting edge or with a series of teeth or serrations as shown in Fig. 8.

What I claim is:—

1. A culinary utensil including a spoon like bowl having one side edge abruptly curved and the remaining side edge substantially flat, said bowl having grater punchings extending from the convex surface of the bowl and increasing in size by regular gradation from the flat to the curved side of the bowl.

2. A culinary utensil including a spoon like bowl having one side edge abruptly curved and the remaining side edge substantially flat, said bowl having grater punchings extending from the convex surface of the bowl and increasing in size by regular gradation from the flat to the curved side of the bowl, the spacings between said punchings increasing in distance from the flat to the curved edge of the bowl.

3. A culinary utensil including a spoon like bowl having one side edge abruptly curved and the remaining side edge substantially flat, said bowl having grater punchings extending from the convex surface of the bowl, said punchings being arranged in straight rows parallel to the longitudinal axis of the bowl, the punchings in alternate rows being staggered in position, said punchings being of the same size in each row but increasing in size row by row from the flat to the curved edge of the bowl.

4. A culinary utensil including a spoon like bowl having one side edge abruptly curved and the remaining side edge substantially flat, said bowl having grater punchings extending from the convex surface of the bowl, said punchings being arranged in straight rows parallel to the longitudinal axis of the bowl, the punchings in alternate rows being staggered in position, said punchings being of the same size in each row but increasing in size row by row from the flat to the curved edge of the bowl, said rows being spaced gradually further apart from the flat to the curved side of the rows and the spaces between the punchings likewise increasing row by row from the flat to the curved edge of the bowl.

In witness whereof I have signed this specification.

EDITH MARY BOLTON.